United States Patent [19]

Bischoff et al.

[11] Patent Number: 4,694,368
[45] Date of Patent: Sep. 15, 1987

[54] THIN FILM MAGNETIC HEAD WITH THREE SUPERIMPOSED COILS

[75] Inventors: Peter G. Bischoff, Cupertino; David J. Rauch, Milpitas; Vincent D. Retort, Cupertino; John R. Osborne, Saratoga, all of Calif.

[73] Assignee: Read-Rite Corporation, Milpitas, Calif.

[21] Appl. No.: 817,621

[22] Filed: Jan. 10, 1986

[51] Int. Cl.$^4$ ............................ G11B 5/31; G11B 5/17
[52] U.S. Cl. ..................................... 360/126; 360/123
[58] Field of Search ................................ 360/123, 126

[56] References Cited

U.S. PATENT DOCUMENTS

| | | | |
|---|---|---|---|
| 3,685,144 | 8/1972 | Trimble | 360/123 |
| 4,044,394 | 8/1977 | Hanazono et al. | 360/123 |
| 4,593,334 | 6/1986 | Anderson et al. | 360/126 |

*Primary Examiner*—Robert S. Tupper
*Attorney, Agent, or Firm*—Flehr, Hohbach, Test, Albritton & Herbert

[57] ABSTRACT

A thin film magnetic head is made with a center-tapped coil structure formed of three layers of coils. The middle coil is configured to be bifilar. When recording data on a magnetic medium, current flows through one-half of the bifilar coil and through one adjacent coil to create positive transitions, and for negative transitions, current flows through the other half of the bifilar coil and through the other adjacent coil. When reading the data that is recorded on a magnetic medium, all turns of the entire coil configuration operate for transducing the data.

8 Claims, 5 Drawing Figures

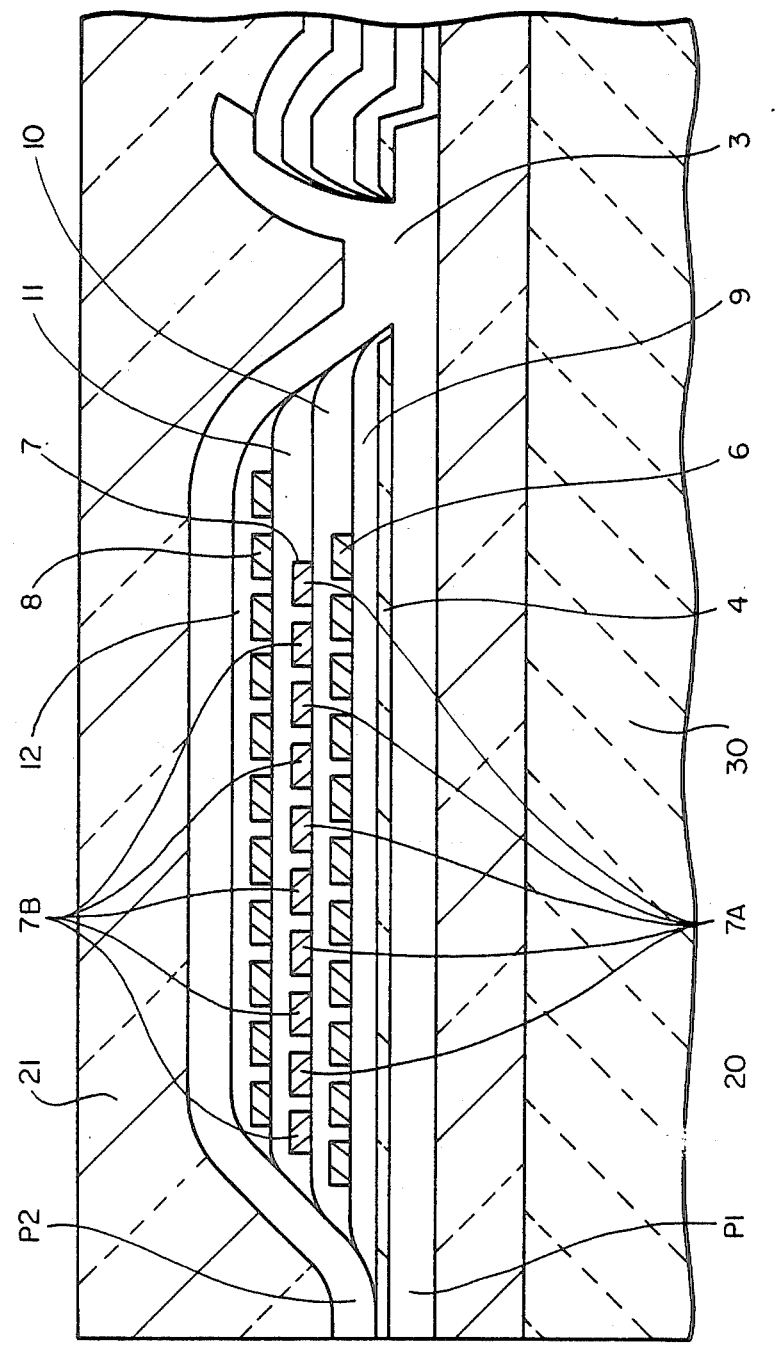
FIG_1A

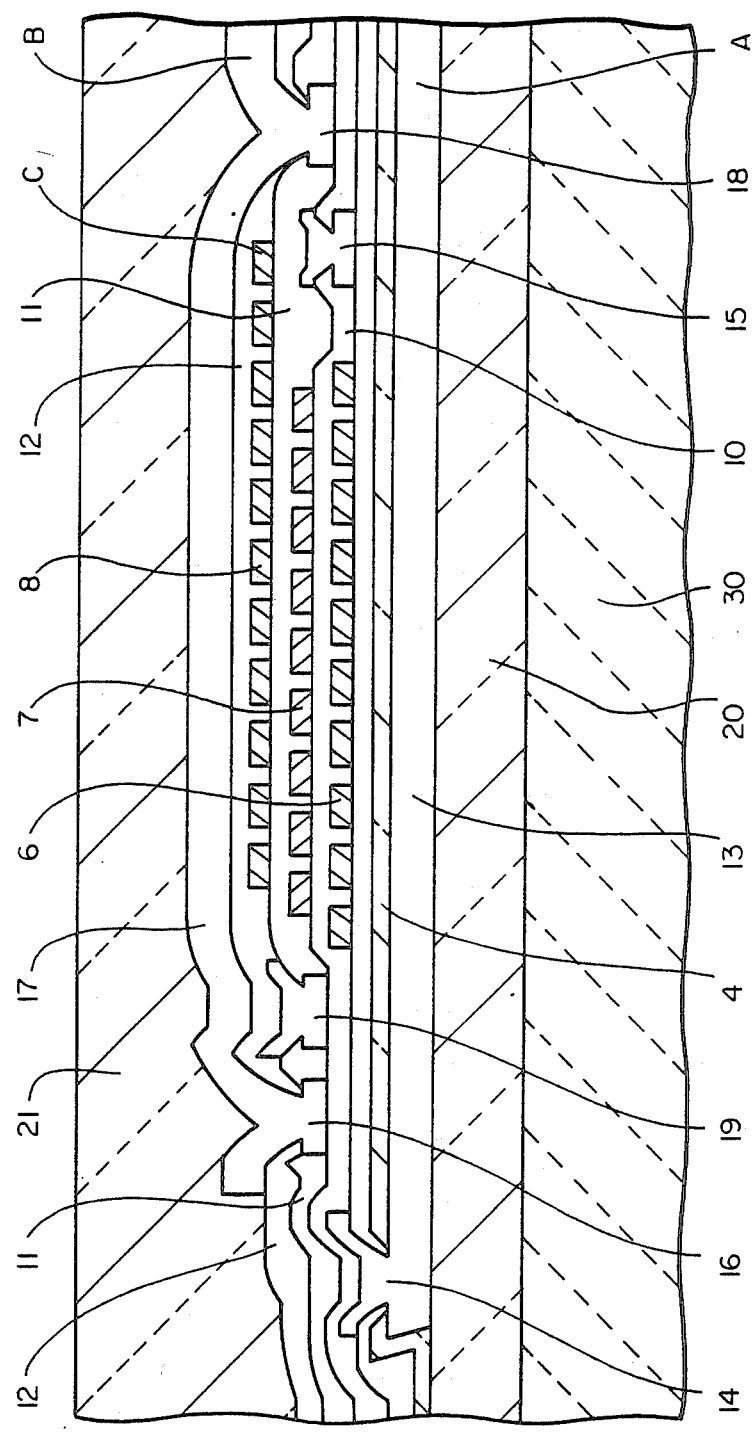
FIG_1B

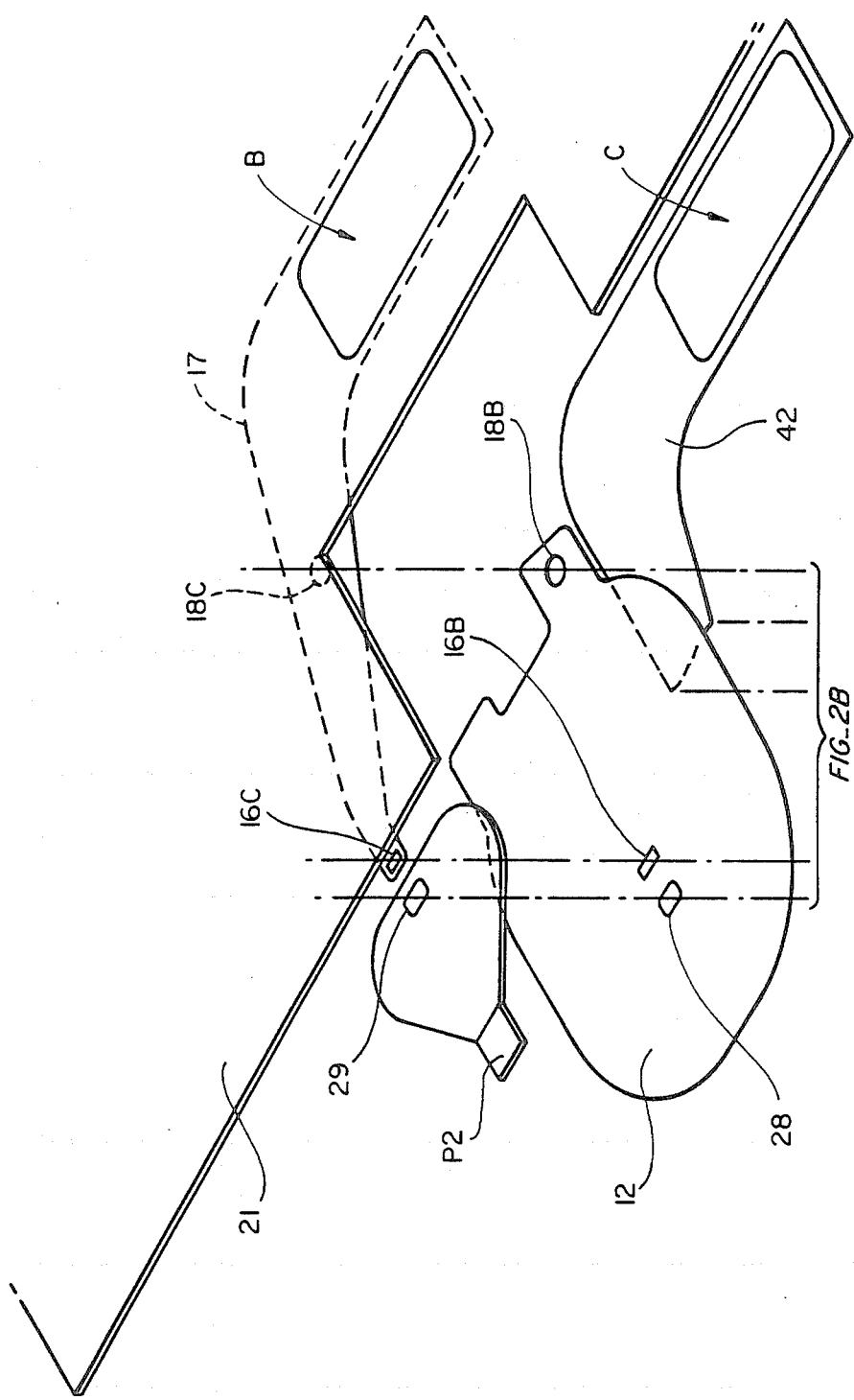

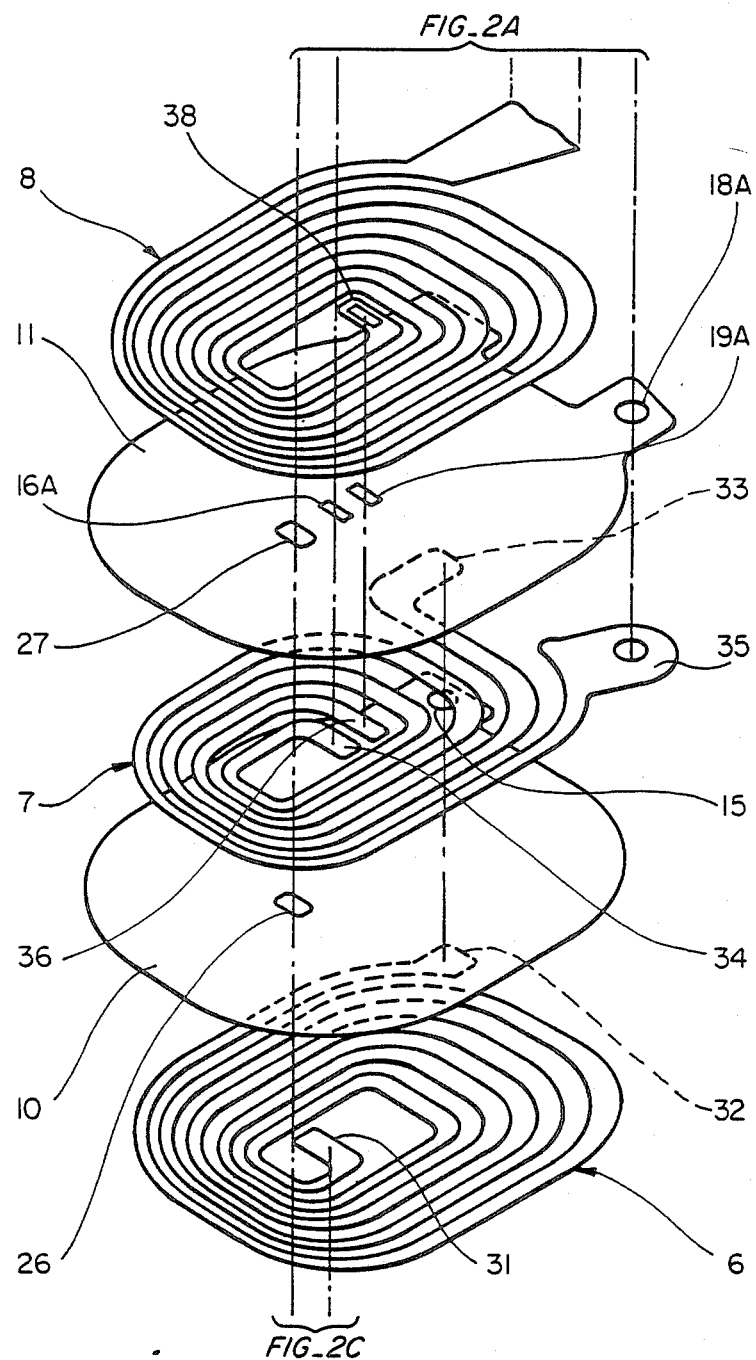
FIG_2B

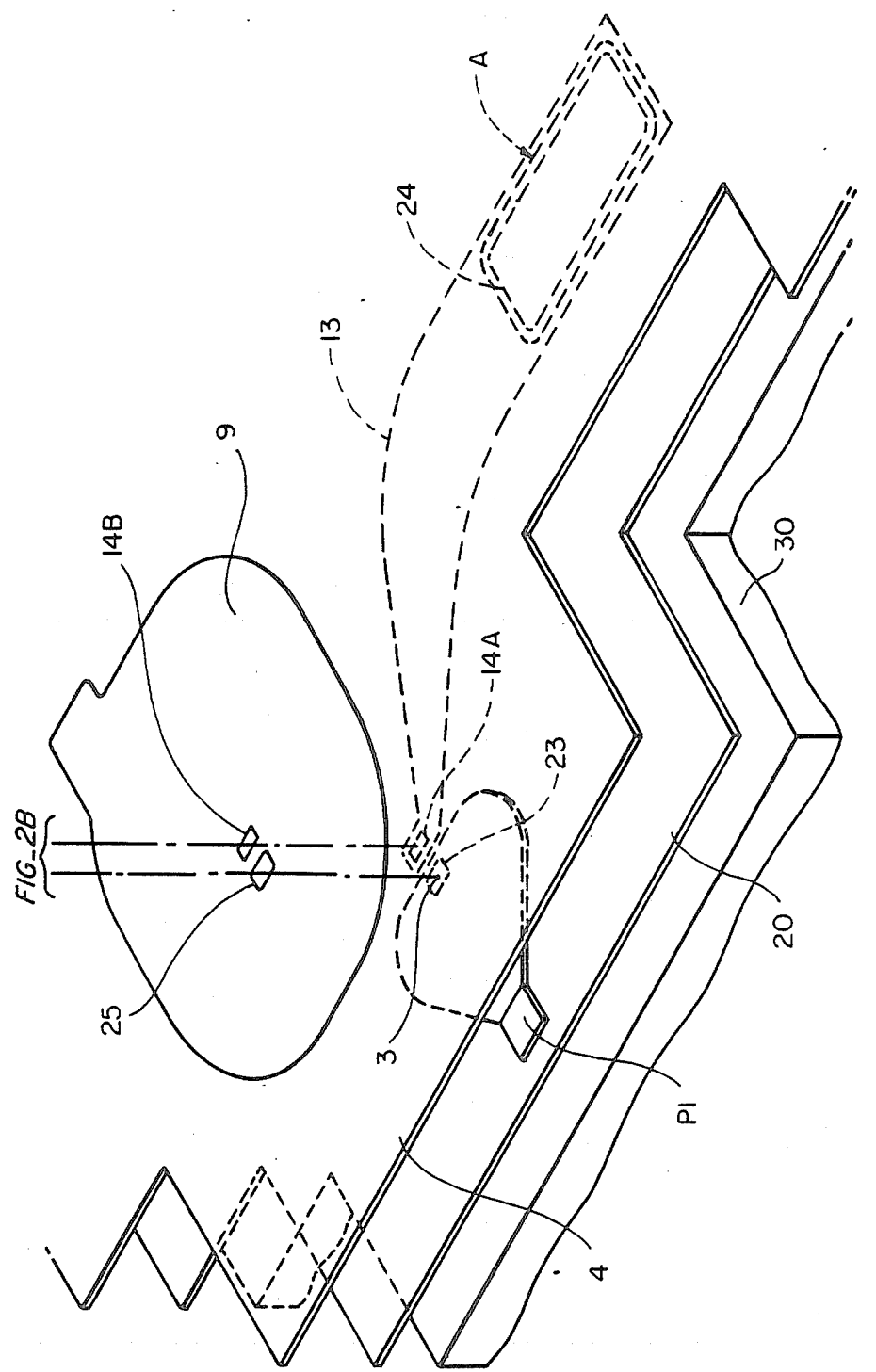

4,694,368

THIN FILM MAGNETIC HEAD WITH THREE SUPERIMPOSED COILS

TECHNICAL FIELD

This invention relates to a thin film magnetic head and in particular to the structure of a coil assembly incorporated in the magnetic head.

BACKGROUND OF THE INVENTION

In the production of thin film magnetic heads, one objective is to provide high signal amplitude during reading of data which is recorded on a magnetic medium. It is known that by increasing the number of turns of the coil assembly, a significant increase in signal amplitude is obtained. Thin film heads have been made with one coil or two superimposed layers of coils having a multiplicity of turns. The geometry and available space of the design of the thin film head tend to limit the number of turns that can be formed.

SUMMARY OF THE INVENTION

In accordance with this invention, a thin film magnetic head is made with three superimposed coils interconnected in a substantially symmetrical configuration. The coils are disposed in a three layer stack between magnetic pole pieces. The center coil is formed with a bifilar geometry, and the total number of turns in the coil assembly is designed to be an even number. During the write process, one coil and one-half of the central coil are energized by an applied electrical current to generate a magnetic flux representing transitions of one polarity, and the other coil and the other half of the central coil are energized to generate transitions of the opposite polarity, so that data represented by such transitions are recorded on the magnetic medium. During the read process, all three interconnected coils cooperate to produce current in response to magnetic flux sensed by the transducing gap of the head that is positioned closely adjacent to a moving magnetic medium, which may be a rotating magnetic disk by way of example. In this way, a significant increase in signal amplitude is obtained with a relatively compact thin film transducer.

BRIEF DESCRIPTION OF THE DRAWINGS

The invention will be described in detail with reference to the drawing in which:

FIGS. 1A and 1B represent a cross-sectional side view of the thin film magnetic head, made in accordance with this invention; and FIGS. 2A through 2C represent an exploded view of the thin film magnetic head and novel coil assembly of this invention.

DESCRIPTION OF THE PREFERRED EMBODIMENT

With reference to the drawings, a thin film magnetic head is made in accordance with this invention by first preparing a ceramic substrate 30 for deposition of the different layers that form the magnetic head. The ceramic substrate is polished to present a smooth surface on which a layer of aluminum oxide 20 having a thickness of about 15 microns is deposited by r.f. sputtering for example. The insulating oxide layer 20 is lapped and polished to a thickness of about 12 microns to eliminate defects. To form the first pole piece P1, a nickel alloy having about 81% nickel and 19% iron is deposited by r.f. sputtering to a thickness of about 1,000Å over the entire wafer. A mask is used with standard photolithographic processes to form the pattern of the bottom pole piece P1 and an adjoining interconnect layer 13. The layer 13 connects a bonding pad A, which is formed at a later process step, to one end 31 of the first or lower coil 6 of a coil assembly. The P1 pole piece and the interconnect layer 13 are then plated to the desired thickness. Following another masking sequence, undesired NiFe in the field as well as the seed layer are removed using a standard etching process.

After deposition of the first pole piece P1, a transducing gap 4 is formed by deposition of a thin layer of aluminum oxide, which may be 10 to 40 microinches thick. The aluminum oxide is deposited over the entire surface of the P1 pole piece layer. The portion of the aluminum oxide in the area of the back gap 3, and at the via 14a formed in interconnect 13, and the via 24 at the bonding pad A is removed by standard masking and etching steps.

A first insulation layer 9 is then deposited. The insulation may be formed by baking and hardening the photoresist layer used to define the geometric pattern of the insulation layer. The insulation layer 9 is made slightly larger than the pattern of the coil assembly to be deposited, and is opened at via 14a of the interconnect 13 and via 23 of the back gap closure 3, so that vias 25 and 14b respectively are formed to allow the necessary interconnections. Insulation layer 9 also serves as a smoothing layer fabricated after forming the pole piece P1 and the interconnects for the coil assembly.

The first spiral coil layer 6 of the coil assembly is fabricated by first depositing a seed layer, which may be a layer of titanium or chromium of about 500–1,000Å, on which a copper layer of about 1,000Å is deposited by r.f. sputtering. The titanium or chromium acts as an adhesion layer for the copper. The lower coil pattern is defined by photolithography, in a well known manner and the coil is plated to a thickness of about two to three microns. The photoresist is then stripped off and the seed layer is removed by chemical etching, ion milling or back sputtering, thereby leaving the desired pattern of lower coil 6. One end of the coil 6 begins at interconnect 13, via 14a and the other end of the coil 6 is connected through via 15 to coil end 33.

The second insulation layer 10 is then fabricated similarly to the first insulation layer 9, but is made slightly smaller than the first insulation layer in order to provide a proper gentle slope at the edges of the layer. The insulation layer 10 covers the coil 6, except at the location of via 15 and the back gap closure 3.

A second coil layer 7 is then deposited, in a manner similar to the first coil 6. However, the second coil layer 7 is formed as a bifilar structure, so that the coil assembly may be used as a center-tapped device.

A third insulation layer 11 is then deposited to cover the central bifilar coil 7 and all other lower structures, excepting the back closure 3 and via 16a, via 18a and via 19a.

The third coil 8 is fabricated in the same manner as described with respect to coil 6 and coil 7. Insulation layer 12 is then deposited over the entire coil structure, excepting for the back closure 3, via 16b and via 18b. The upper pole piece P2 is then fabricated together with interconnect 17 which is made of the same Permalloy material as pole piece P2, and connected to bonding pad B, which is formed at a later step.

Bonding pads A, B, and C are plated by a photoresist process with copper, by way of example, to a height substantially above the highest point of the magnetic yoke structure, which is about 40 micrometers in this embodiment. The completed thin film head is then completed by encapsulating the entire structure with a relatively thick aluminum oxide insulating layer 21, which is r.f. sputter deposited to a thickness of about 40–45 microns. The overcoat layer 21 provides structural strength to the magnetic structure and protection during machining of the air bearing slider associated with the thin film transducer and during lapping for obtaining the proper desired throat height.

During r.f. sputtering of the aluminum oxide overcoat layer 21, the copper studs or bonding pads A, B and C are covered. Therefore, the wafers are put through a lapping process to reexpose the copper bonding pads for connection to electrical circuitry. To facilitate bonding of wires to the copper pads, the copper is coated with gold to a thickness of about 3–5 microns.

With reference to FIGS. 2A–2C, circuit connection for a continuous flow path for current through the coil assembly is accomplished by alignment of the vias and interconnects formed with the coils and interposed layers to allow coupling of the coils to bonding pads A, B, C for further connection to external circuitry. To this end, the inner terminal 31 of coil 6 is connected with interconnect 13 through vias 14a and 14b. The outer end 32 of the lower coil 6 is coupled to the outer terminal 33 of the bifilar coil portion 7a through via 15 of insulation layer 10. The inner end 34 of coil portion 7a is coupled to bonding pad B through via 16a in the insulation layer 11, via 16b in the insulation layer 12, and the inner end 16c of the interconnect 17 which is joined to bonding pad B. The connection from coil portion 7b at its inner end 36 is made through via 19a formed in the insulation layer 11 and to the inner terminal 38 of the upper coil 8, while the outer end of coil portion 7b is connected by the interconnect 35 to bonding pad B through via 35a, via 18a of insulation layer 11, via 18b of insulation layer 12, and portion 18c of the interconnect 17. Coupling between the pole pieces P1 and P2 is provided through aligned vias 23 formed by the Al$_2$O$_3$ gap layer in the P1 pole piece, via 25 in the first insulation layer 9, via 26 in the second insulation layer 10, via 27 in the third insulation layer 11, via 28 in the fourth insulation layer 12 and portion 29 in pole piece P2. The outer leg of the upper coil 8 is joined to the interconnect 42 which leads to bonding pad C. The bonding pads in turn are connected through electrical contacts and leads to external circuitry for processing data signals directed to and from the record medium 5.

It should be noted that for simplicity and convenience, the Figures illustrate a limited number of coil turns. In a preferred implementation, the upper and lower coils each have eleven turns and the central bifilar coil has five turns in each portion or a total of ten, making a complete three layer coil configuration of 32 turns. For symmetry and balance, the total number of turns of the three coils is made to be an even number.

There has been disclosed herein a thin film magnetic head having a novel configuration of a coil assembly which is characterized by symmetry and increased signal amplitude. The three coil arrangement including a central bifilar coil which has one portion connected to the lower coil and the other portion connected to the upper coil ensures an electrical and magnetic field balance. Positive and negative transitions respectively are processed separately by one portion of the bifilar coil in conjunction with one adjacent coil, and by the second portion of the bifilar coil in conjunction with the other adjacent coil.

What is claimed is:

1. A thin film magnetic head assembly comprising:
   a nonmagnetic substrate;
   first and second magnetic pole piece layers deposited over said substrate;
   nonmagnetic insulating material disposed between said pole piece layers, said material forming a transducing gap;
   said pole pieces being connected to form a back gap closure; and
   an electrically conductive coil assembly including upper and lower layers of coil turns, and a central layer of coil turns disposed between said upper and lower layers of coil turns, said central layer being bifilar, said coil assembly being disposed in said nonmagnetic insulating material and between said pole piece layers.

2. A thin film magnetic head assembly as in claim 1, wherein the total number of coil turns of the three layers of coils is an even number.

3. A thin film magnetic head assembly as in claim 2, wherein said total number of turns is 32.

4. A thin film magnetic head assembly as in claim 1, wherein said bifilar coil consists of two coil portions disposed in the same plane and having interleaved turns; and each coil portion has two terminations, a termination of said lower coil being connected to a termination of one of said coil portions and a termination of said upper coil being connected to a termination of the other coil portion.

5. A thin film magnetic head assembly as in claim 4, including conductive interconnections between the remaining terminations of said coils and bonding pads for making a continuous conductive path for connection with external electrical circuitry.

6. A thin film magnetic head assembly as in claim 5, including vias formed through said insulating material for providing paths for said interconnections.

7. A thin film magnetic head assembly as in claim 4, wherein one coil portion of said central coil is utilized for recording information having positive transitions, and the other coil portion of said central coil is used during the recording mode for recording negative transitions.

8. A thin film magnetic head assembly as in claim 1, wherein said coil assembly is a center-tapped coil structure.

* * * * *